8168X
NO PRINTED SPECIFICATION AVAILABLE
W. Rowe.
Hulling Mach.
Patented Apr. 25, 1834.
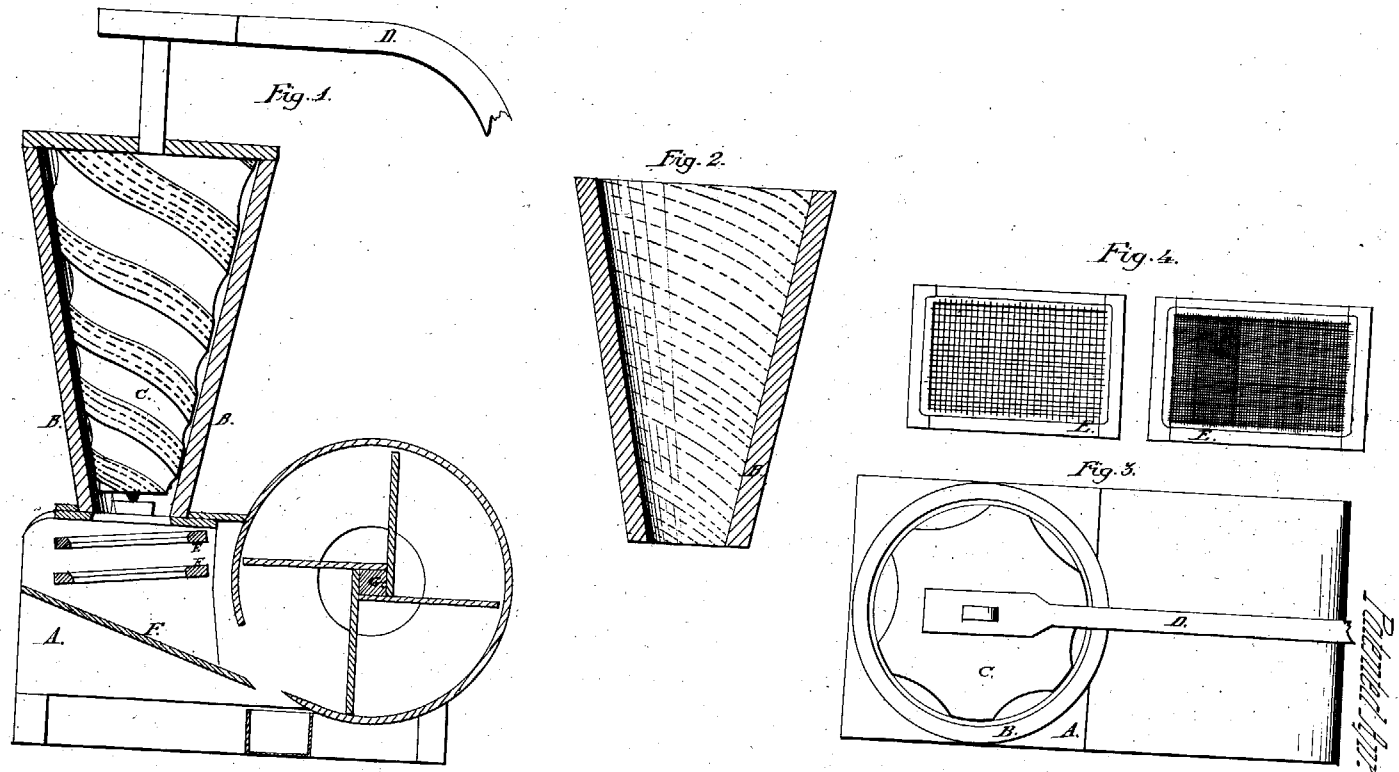

Apl 25, 1834

William Rowe, Philips Maine

Letters Patent

81684

The Schedule referred to in these Letters Patent and making part of the same containing a description in the words of the said William Rowe himself of his improvement in the Machine for hulling Clover Seed & other grains.

To all to whom these presents shall come Be it known that I William Rowe of Philips in the County of Somerset and State of Maine have invented a new and useful improvement in hulling Clover Seed rice or other grains and that the following is a full and exact description of the Construction and operation of the said Machine as invented or improved by me.

A conical Cylinder is formed of wood or other suitable material of about two feet in diameter at the top and diminishing to about one foot in diameter at the bottom. This Cylinder is lined with Strips of Sheet iron perforated through all the surface with holes punched from the outside so as to form a rough cutting surface similar to that of a grater projecting inwards.

Within this Cylinder thus furnished work a Conical Spiral Core or Screw secured in its vertical position by a projection of the axis at the bottom working in a Step formed to receive it at the bottom of the hollow Cylinder. This Core is fashioned into a Screw the projections of the thread being covered with Strips of perforated Sheet iron with the roughnesses projecting against those of the Cylinder. The axis of the core projects on top above the frame to which it is adjusted sufficiently to receive the means or gearing by which it is to be driven which may be applied at either end of the axis and which may be simply a lever slipping on the top and turned by a horse after the manner of a Cider Mill or by Steam water or any other power.

Sufficient Space is left between the core and the Cylinder to receive the Substance to be hulled or rubbed and this Space is wider at the top than the bottom. To the bottom of this Machine is adjusted an apparatus for separating the seed or grain from the Chaff and consists of two Sieves the one below the upper one the finest and serving to convey of the Seed or grain Completely Cleaned from the hull on to a kind of Shelf below which by the violent Shaking of the whole and the inclination at which it is [illegible] pour down a Stream of Seeds to the action of a fan blowing directly into the mouth
[illegible] and lighter substances by means of [illegible] at [illegible]. The [illegible] parts of the
of this [illegible] of the sieve The upper or Coarse Sieve Carries off the hull or husk and the Shelf receives the Cleaned Seed falling thro' a Current of wind and drops it in a heap at the mouth ready for Market—

In witness that the above is a correct Specification of my machine as invented by me I have hereunto set my hand this twenty Second day of April Eighteen Hundred and thirty [illegible]

William Rowe

Exd [illegible] Witness
Henry Stone
Robt Clarke

Drawing

[640 Words.